Dec. 14, 1937.   A. G. RAYBURN   2,101,955
INDICATOR
Filed Feb. 21, 1934   2 Sheets-Sheet 1
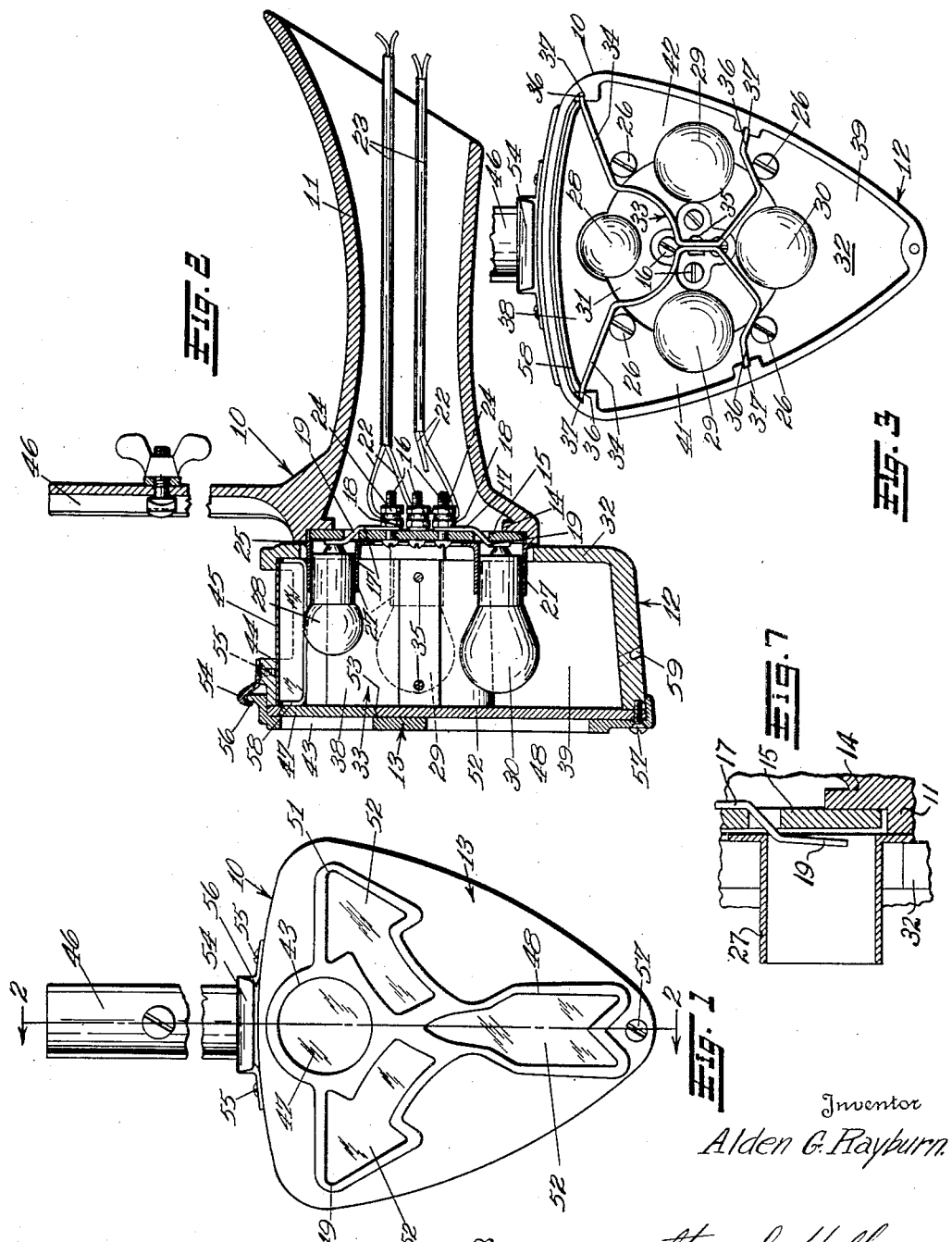
Inventor
Alden G. Rayburn.
By
Strauch & Hoffman
Attorneys

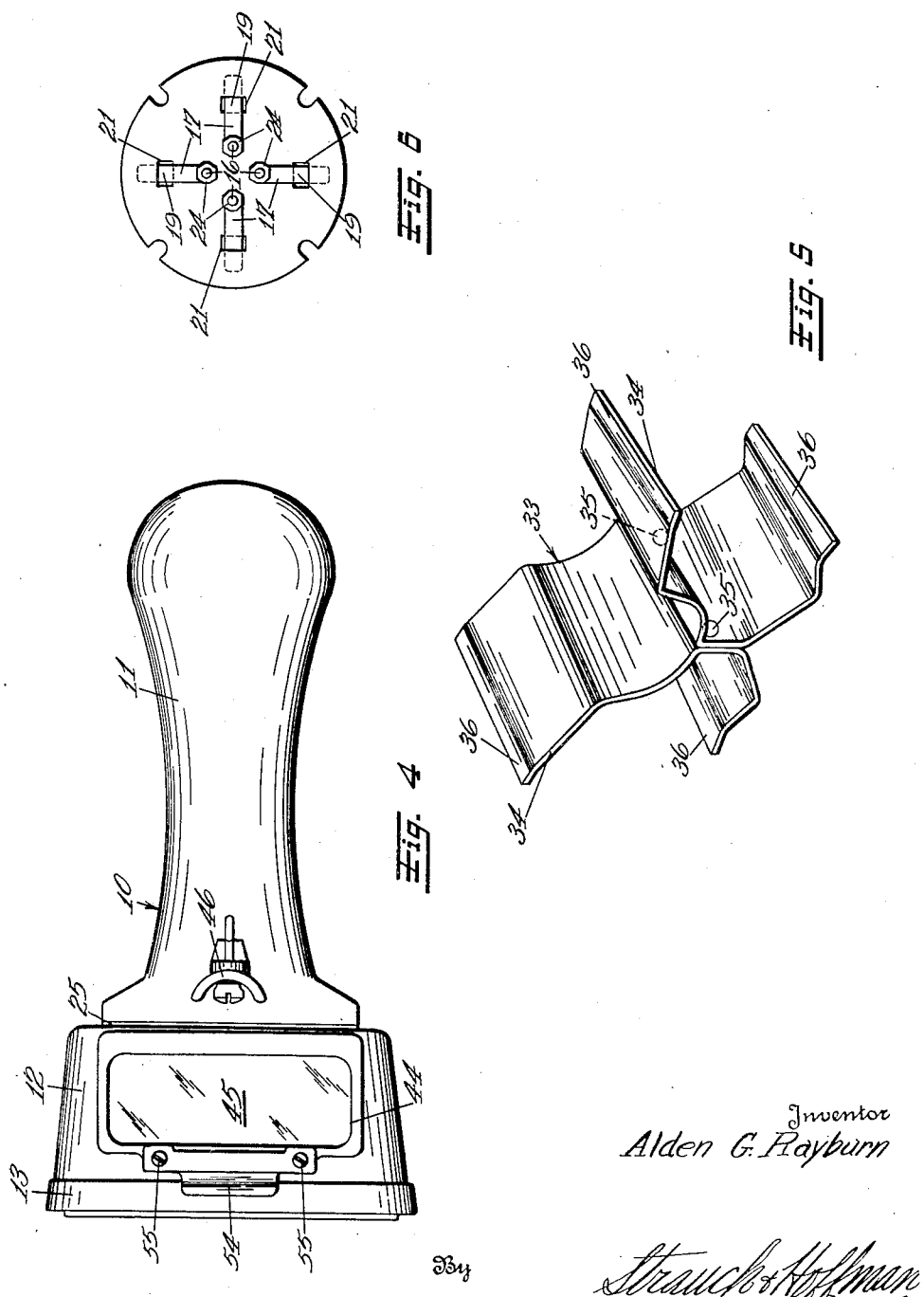

Patented Dec. 14, 1937

2,101,955

UNITED STATES PATENT OFFICE 2,101,955

INDICATOR

Alden G. Rayburn, Sausalito, Calif.

Application February 21, 1934, Serial No. 712,389

6 Claims. (Cl. 177—327)

The present invention relates to indicators of the type that are adapted to give a visible signal.

More particularly the present invention relates to signal lights or visible indicators adapted to be used upon automotive vehicles or the like to give a visible warning to the operators of vehicles that may be in the vicinity of the vehicle upon which the indicator is mounted, that a change of course or speed is about to be made.

It is therefore a primary object of the present invention to provide an indicator or signal light that is extremely simple in construction, cheap to manufacture and adds to rather than detracts from the beauty and appeal of the machine upon which it is mounted.

Another major object of the present invention resides in the provision of a signaling device wherein the stop light, the tail light, the license plate holder and the direction indicator are combined in a single compact and well proportioned unit.

A further object of the present invention resides in the provision of a utility signal wherein the light casing is secured to its support by screws which also serve to maintain the bulb sockets, and the wire terminals in their respective operative positions.

A still further object of the present invention is to provide a direction signal with a single insulating member adapted to carry the contacts for the plurality of indicating lights.

Another object of the present invention resides in the provision of a utility signal wherein the light sockets are integrally formed upon a single plate which is adapted to retain the insulated terminal base upon an annular shoulder which is sufficiently set back within the supporting arm to prevent rain, snow or the like from saturating the base and short circuiting the signal.

A still further object of the present invention resides in the provision of a signal adapted to be used on automotive vehicles wherein separate light bulbs are received in individual sockets integrally formed upon a metallic base which also forms the grounding means for the current used to operate the said bulbs.

Another object of the present invention resides in the provision of a partitioning member which is adapted to slidably fit within grooves integrally formed within the light casing and divides the casing into a plurality of independent sections each of which contains a light bulb separately operated by an individual contact.

An additional object of the present invention resides in the provision of a cover member for the open face of the light casing that is adapted to be held in place by means of a single screw in combination with a groove provided on the top of the casing.

A further object of the present invention resides in the provision of a plurality of suitably shaped apertures formed in the face of the cover which are adapted to cooperate with the plurality of sections formed in said casing in such a manner that when the light bulb within any of said sections is lighted by the operator of the vehicle a visible indication of the change in direction, speed or the like which the operator contemplates making may be readily viewed by the drivers of other vehicles.

A still further object of the present invention resides in the provision of a visible signal of the character heretofore mentioned wherein the individual light bulbs are readily accessible when the cover is removed.

Another object of the present invention resides in providing a signal light of the above mentioned character with a translucent material which is capable of rendering the cut out portions of the cover more readily discernible than if no colored medium were used or if colored glass were used.

Still further objects of the invention will become apparent as the description proceeds in connection with the appended claims and the accompanying drawings wherein:

Figure 1 is an elevational view of a preferred embodiment of my signaling device or indicator showing it as it would appear to the driver of a vehicle following the vehicle upon which it is mounted.

Figure 2 is a sectional view through the light shown in Figure 1 and is taken on line 2—2 of that figure, looking in the direction of the arrows.

Figure 3 is a view similar to Figure 1 but with the cover removed, so as to show the division plate and the compartments formed thereby.

Figure 4 is a top plan view of the device shown in Figure 1, and illustrates the provision made for lighting the license plate.

Figure 5 is a perspective view of the division plate utilized in the device.

Figure 6 is a rear view of the insulating base upon which the electrical contacts for the several bulbs are mounted.

Figure 7 is a fragmental sectional view of the socket member and contact plate in operative position and illustrates the parts as they appear when no lamp bulbs are in place in their sockets.

With continued reference to the drawings, wherein like reference characters are utilized to indicate the same parts throughout the several figures, the numeral 10 designates generally the combination tail light, direction indicator and stop light of the present invention.

The light 10 comprises a supporting arm or bracket 11, and a housing 12, having a cover 13, which is adapted to contain the entire signaling mechanism, and the construction of the latter will be hereinafter described in detail. The bracket 11 as shown in the drawings is adapted to be secured to the fender (not shown) of an automobile or like vehicle. Although the bracket 11 of the illustrated embodiment is of the type adapted to be secured to the fender it is to be understood that the same may be varied in detail for the purpose of supporting the light upon the vehicle in any other suitable manner.

The bracket 11 is of hollow construction and is provided with an annular shoulder or ledge 14 which is adapted to receive and position an insulated contact carrying member 15, (Figure 6). Member 15 is provided in the illustrated embodiment with four centrally disposed contact posts 16. Posts 16 are provided with suitable diametrically opposed flat preferably brass contacts 17 which are secured to posts 16 by nuts 18 which also serve to retain posts 16 on member 15, one contact being secured to each post 16. Contacts 17 are suitably off-set at 19 and are adapted to project through apertures 21 provided in member 15 for a purpose to be presently described. Posts 16 are furthermore provided with electrical supply wires 22 which are carried by suitable flexible cables 23 through bracket 11 and suitable switches (not shown) to a source of electrical energy, such as the battery of the vehicle. Wires 22 are secured to posts 16 by nuts 24.

As more clearly seen in Figure 2 of the drawings, the member 15 is disposed in nested relation upon ledges or groove 14 of bracket 11. The purpose of this nesting of member 15 is to prevent insulating member 15 from becoming wet and thereby "shorting". In order to seal the joint between the bracket 11 and the housing 12 a preferably soft metal annular socket member 25 is positioned between bracket 11 and housing 12 which are adapted to be drawn into fluid-tight or sealing engagement with member 25 by screws 26 which pass through suitable notches formed in the periphery of member 15, and into shoulder 14. If desired, gaskets may be placed on either side of member 25 to assist in sealing the device, but it has been found that a very effective seal may be obtained by making the member 25 of a relatively soft metal, and drawing the parts into relatively tight engagement by screws 26.

Member 25 is provided with suitable sockets 27 for receiving a plurality of bulbs 28, 29 and 30. In the present instance sockets 27 are made as an integral part of member 25 although they may be separately formed and attached to member 25 if desired. Sockets 27 are adapted to project through a suitably shaped aperture 31 formed in the rear wall 32 of housing 12. Sockets 27 are so spaced that each socket is disposed directly over a contact member 17 so that the bulbs associated with the sockets are capable of independent operation.

When the lamp sockets are empty, contacts 19 assume the position shown in Figure 7, spaced from the surface of member 15. Therefore, when the lamps are placed in sockets 27 they flex contacts 19 toward member 15, and the latter, being freely disposed in the space between the socket carrying member and shoulder 14, is resiliently forced and held against shoulder 14.

In order that the desired operation of the signal of the present invention may be obtained it is necessary to divide housing 12 into a plurality of sections corresponding to the number of bulbs used therein. This is effected in the present invention by providing a simple and inexpensive division member 33, which is made up of two suitably formed sheet metal plates 34. Members 34 are preferably formed from a flat sheet metal strip by suitable dies and are joined at the approximate center of housing 12 by rivets 35 or the like. Member 33 as herein shown is provided with four off-set runners 36. Runners 36 are adapted to be slidably associated with slots or grooves 37 integrally formed in housing 12. When member 33 is assembled as seen in Figure 3, with runners 36 disposed within grooves 37, housing 12 is separated into four individual compartments 38, 39, 41, and 42 each of which contains an independent and separately operable bulb.

In the embodiment shown in the drawings the bulb 28 positioned within compartment 38 is designed to function as the tail light and license plate illuminator. In order that the bulb 28 may perform the desired functions cover 13 and housing 12 are provided with suitable apertures 43 and 44 respectively. Aperture 44 is provided with a clear, transparent closure 45 of glass, Celluloid or the like so that the light from bulb 28 will be transmitted therethrough and shine upon the license plate which is adapted to be carried by a supporting arm 46 which is integrally formed upon bracket 11. Aperture 43 is provided with a translucent closure 47 which will be hereinafter described in detail.

The bulb 30 in compartment 39 is also adapted to perform the two-fold function of a stop light and a continuation of the left and right turn arrows. The contact 17 associated with bulb 30 is accordingly preferably connected through its wire 22 in a manner that will permit its energization upon operation of either the brake controlled stop light switch, or the left and right turn switch. Cover 13 is suitably apertured at 48 to provide an elongated tail piece of the indicating arrow heads which is illuminated when the left-right turn switch is operated and which provides an elongated stop indicator, as it is also preferably illuminated when the brake is operated in a manner to be pointed out hereinafter.

Compartments 41 and 42 are provided with bulbs 29 one of which is lighted upon operation of the indicator controlling switch in one direction and the other upon operation of the switch in the opposite direction. Cover 13 is suitably apertured at 49 and 51 in alignment with compartments 41 and 42 respectively in the form of arrows pointing toward the left and right. When the left-right turn switch is operated one or the other of the apertures 49 or 51 is lighted in conjunction with aperture 48 to thereby produce an indicating arrow of sufficient size to be readily seen by other vehicle operators. The present invention contemplates a one piece translucent closure member 52 adapted to cover apertures 48, 49 and 51.

Closure members 47 and 52 used in the present invention are of a material sold on the market under the trade name of "Catalin" which is one of many resin products that are satisfactory for use. It has been found preferable to use this material rather than glass due to the fact that it will not easily break or crack and the light emitted therefrom is discernible for a much greater distance, and the outlines of the apertures are more definitely outlined than when glass is used. In the present embodiment of the invention member 52 is provided with an aperture 53 which is adapted to receive member 47. The members 52 and 47 are of different colors namely green and red respectively.

The present invention provides a very efficient and simple means which will now be described for retaining cover 13 upon housing 12. Housing 12, adjacent to aperture 44, is provided with a hook shaped clip 54 which is secured thereto by screws 55. Clip 54 is made of a somewhat resilient metal and is so shaped that a projection 56 integrally formed upon cover 13 may be received therein. After projection 56 is associated with hook 54, cover 13 is pivoted downwardly about member 56 as an axis and brought into the position shown in Figure 2, and the bottom of cover 13 is then secured to housing 12 by means of a screw 57. Cover 13 is accordingly secured to housing 12 in such a manner that it is necessary to remove only one screw in order to remove it and gain access to the interior of housing 12. When cover 13 is removed, bulbs 28, 29 and 30 and partition member 33 are accessible for removal or any other purpose. Furthermore the above described securing means eliminates the necessity of utilizing a number of screws or the like which may be easily lost when the cover is removed or which may be lost by jarring loose.

Closure 45 is maintained in position by means of a snap spring 58 (Figure 2) which fits between the upper portion of housing 12 and runners 36 formed on the upper extensions of members 34. Although the closure 45 in the illustrated form of the invention is positioned within the housing 12, it may be secured to the outer face thereof in any suitable manner. The housing 12, although so designed as to substantially preclude the entrance of moisture, is provided with a drain hole 59 in order to prevent the accumulation of moisture therein due to breakage of the closure 45 or any other failure.

From the above description it will be apparent that the present invention provides a signal light that is very simple and attractive, easy to assemble and disassemble and free from the objections incident to previous lights of this character.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle signal or the like, a signal housing having a clamping face; a supporting element adapted to secure said signal to a portion of the vehicle and having a clamping face which is substantially co-extensive with the clamping face of said housing; a lamp socket carrying member of relatively soft metal disposed between said housing and said supporting member having opposed clamping faces that are substantially co-extensive with said housing and supporting member clamping faces; and means for holding said housing, said supporting element and said lamp socket carrying member in assembled relationship with the clamping faces in clamping engagement to form a liquid tight joint between the supporting element and the housing.

2. A vehicle signal light comprising a casing having at least two open faces; an apertured cover adapted to close one of said open faces; a member secured to a portion of the vehicle at one end and having a clamping face at its other end; a clamping face surrounding the other open face of said casing; a socket member having a central opening therein; a peripheral clamping surface on said socket member adapted to be received between the clamping surfaces on said casing and said first mentioned member; a second clamping surface on said first mentioned member disposed inwardly of said first clamping surface; a contact carrying member having a clamping face disposed between said second clamping surface and said socket member; contact posts disposed in the opening of said socket member; and means for securing said casing to said first mentioned member and for properly positioning said contact carrying member with respect to said socket member.

3. The combination defined in claim 2, wherein the contact posts carry spring contact members which are biased away from said contact carrying member for resiliently engaging a light bulb and urging said contact member into engagement with the second clamping face provided on the first mentioned member.

4. A vehicle signaling device comprising a housing having open ends; a hollow sleeve adapted to surround the opening in one end of said housing and support the device; an inwardly directed peripheral shoulder in said sleeve; a contact carrying member disposed in said sleeve; a plurality of contact posts disposed centrally of said contact member and said sleeve; a plurality of electrical conduits disposed in said sleeve adapted to connect said posts with a source of energy and designed to be independently energized under predetermined conditions; a socket member having a plurality of sockets adapted to be clamped between said housing and said sleeve; a bulb in each socket; individual spring contacts biased away from said contact carrying member and connecting each of said posts with a predetermined bulb, said spring contacts resiliently urging said contact carrying member against said shoulder when said bulbs are in place in said sockets; and means for clamping said sleeve and said housing and retaining said socket member and said contact carrying member in proper operating position.

5. In a signaling device or the like a support having an abutment and a clamping face; a housing having a clamping face co-extensive with said support clamping face; a lamp socket carrying member open at its center and having clamping faces co-extensive with the clamping faces of said support and said housing; a contact carrying member disposed in said support and adapted to seat on said abutment; radially extending spring contacts normally biased away from the surface of said contact carrying member for contacting bulbs in said lamp socket carrying member and resiliently retaining said contact carrying member on said abutment; and common means for clamping said socket member between the clamping faces of said housing and said support and for preventing rotational movement of said contact carrying member with respect to said socket member.

6. In a vehicle signal, a hollow housing having an open end, the marginal portion of said housing defining a clamping face adjacent said opening, a hollow supporting element having an open end and a clamping face which is substantially coextensive with the clamping face of said housing, said element also having an abutment wall disposed parallel to its clamping face but located inwardly thereof, a lamp socket member disposed between said housing and said supporting element and having opposed clamping faces of relatively soft material disposed and gripped between the clamping faces of said housing and element, lamp sockets mounted on said socket member and projecting into said housing, a contact carrying member disposed between said socket member and the abutment wall of said supporting element, said contact carrying member carrying electrical contacts cooperating with said lamp sockets, and means for releasably maintaining said housing in place on said supporting element with said socket member clamped between them in sealing engagement, said lamp socket member and said contact carrying member being otherwise unattached to each other or to said housing or said supporting element, whereby they may be freely removed and separated upon disassembly of said housing and supporting element.

ALDEN G. RAYBURN.